(12) United States Patent
Chase

(10) Patent No.: US 11,332,954 B1
(45) Date of Patent: May 17, 2022

(54) LAPTOP SHADE AND PLATFORM SYSTEM

(71) Applicant: Ryan John Chase, Denver, CO (US)

(72) Inventor: Ryan John Chase, Denver, CO (US)

( * ) Notice: Subject to any disclaimer, the term of this patent is extended or adjusted under 35 U.S.C. 154(b) by 0 days.

(21) Appl. No.: 17/240,124

(22) Filed: Apr. 26, 2021

(51) Int. Cl.
| | | |
|---|---|---|
| *E04H 15/58* | (2006.01) | |
| *A47B 23/00* | (2006.01) | |
| *A45B 23/00* | (2006.01) | |
| *E04H 15/00* | (2006.01) | |
| *E04H 15/38* | (2006.01) | |
| *G06F 1/16* | (2006.01) | |

(52) U.S. Cl.
CPC ............ *E04H 15/58* (2013.01); *A45B 23/00* (2013.01); *A47B 23/001* (2013.01); *E04H 15/008* (2013.01); *E04H 15/38* (2013.01); *G06F 1/1628* (2013.01); *A45B 2023/0006* (2013.01); *A45B 2200/1054* (2013.01)

(58) Field of Classification Search
CPC .... E04H 15/008; A47B 23/002; G06F 1/1628
USPC .................................................. 135/148–150
See application file for complete search history.

(56) References Cited

U.S. PATENT DOCUMENTS

| | | | | |
|---|---|---|---|---|
| 2,482,031 A * | 9/1949 | Rose | .......................... | H04N 5/65 359/602 |
| 2,804,083 A * | 8/1957 | Wieber | .................. | E04B 1/3441 135/137 |
| 4,044,411 A * | 8/1977 | Peterson | ................. | A47C 17/82 5/99.1 |
| 5,271,423 A * | 12/1993 | Eychaner | ............... | E04H 15/001 135/134 |
| 5,325,970 A * | 7/1994 | Dillon | .................... | G06F 1/1628 150/165 |
| 5,400,903 A * | 3/1995 | Cooley | .................... | A45C 13/02 190/29 |
| 5,762,250 A * | 6/1998 | Carlton | .................... | G06F 1/163 224/579 |
| 5,842,495 A * | 12/1998 | Egnew | ..................... | E04H 15/38 135/133 |
| 7,303,077 B2 * | 12/2007 | Harlocker | .............. | G06F 1/1628 206/320 |
| 7,304,839 B1 | 12/2007 | Burns | | |
| 10,310,559 B2 | 6/2019 | Holmes | | |
| 10,649,490 B2 * | 5/2020 | Blattel | .................... | B65D 25/24 |
| 2003/0223119 A1 | 12/2003 | Heiman | | |
| 2004/0206645 A1 | 10/2004 | Roubanis | | |

(Continued)

*Primary Examiner* — Noah Chandler Hawk
(74) *Attorney, Agent, or Firm* — Plager Schack LLP; Mark H. Plager; Naomi Mann

(57) ABSTRACT

A shade and platform device configured to support and partially enclose and shelter a laptop, notebook computer, or other electronic or non-electronic item from sun exposure, allowing users to use their laptop, notebook computer or other electronic or non-electronic item outdoors while reducing screen glare and risk of the sheltered item overheating due to direct sun exposure. The platform component may contain functionality that enables it to fold into a carrying case for the shade, awning, canopy, or hood component. The shade, awning, canopy, or hood component may be collapsed, optionally detached from the platform component, and folded so that it can be compactly secured and stored within the platform case. Furthermore, the platform case may include an attachment element for a stand, such as a tripod, on which the platform case may be supported.

16 Claims, 9 Drawing Sheets

(56) References Cited

U.S. PATENT DOCUMENTS

| | | | |
|---|---|---|---|
| 2011/0011759 A1* | 1/2011 | Luo | A45C 15/06 |
| | | | 206/320 |
| 2013/0265643 A1 | 10/2013 | Armstrong | |
| 2014/0375901 A1 | 12/2014 | Stockett | |
| 2015/0308145 A1 | 10/2015 | Roubanis | |
| 2016/0227663 A1 | 8/2016 | Holmes | |
| 2017/0300086 A1* | 10/2017 | Blattel | G06F 1/1603 |
| 2019/0133280 A1 | 5/2019 | Gordon et al. | |
| 2020/0033918 A1* | 1/2020 | Akalou | G06F 1/1603 |

* cited by examiner

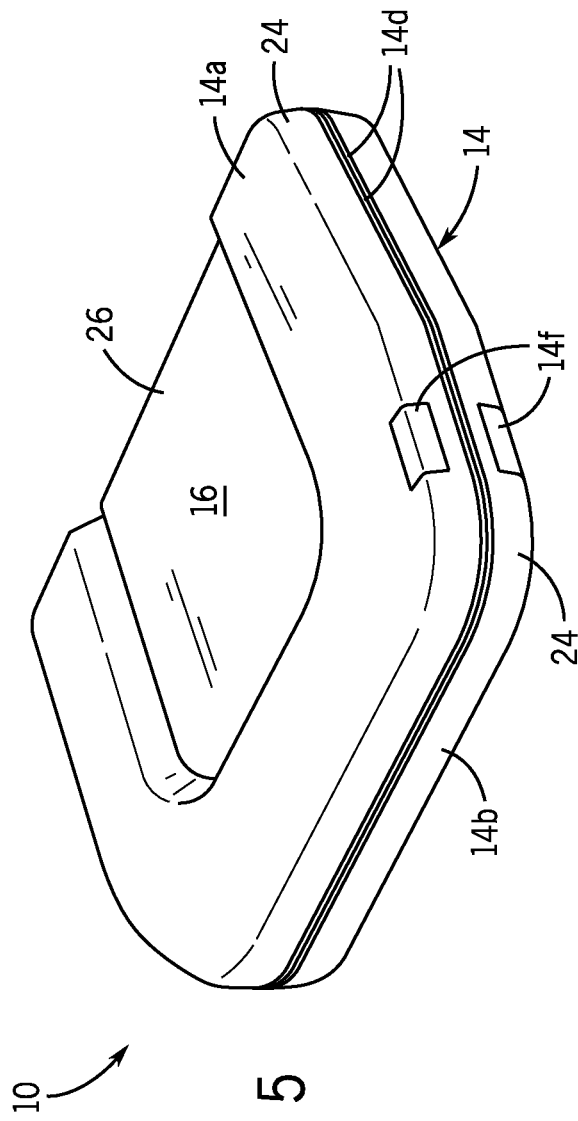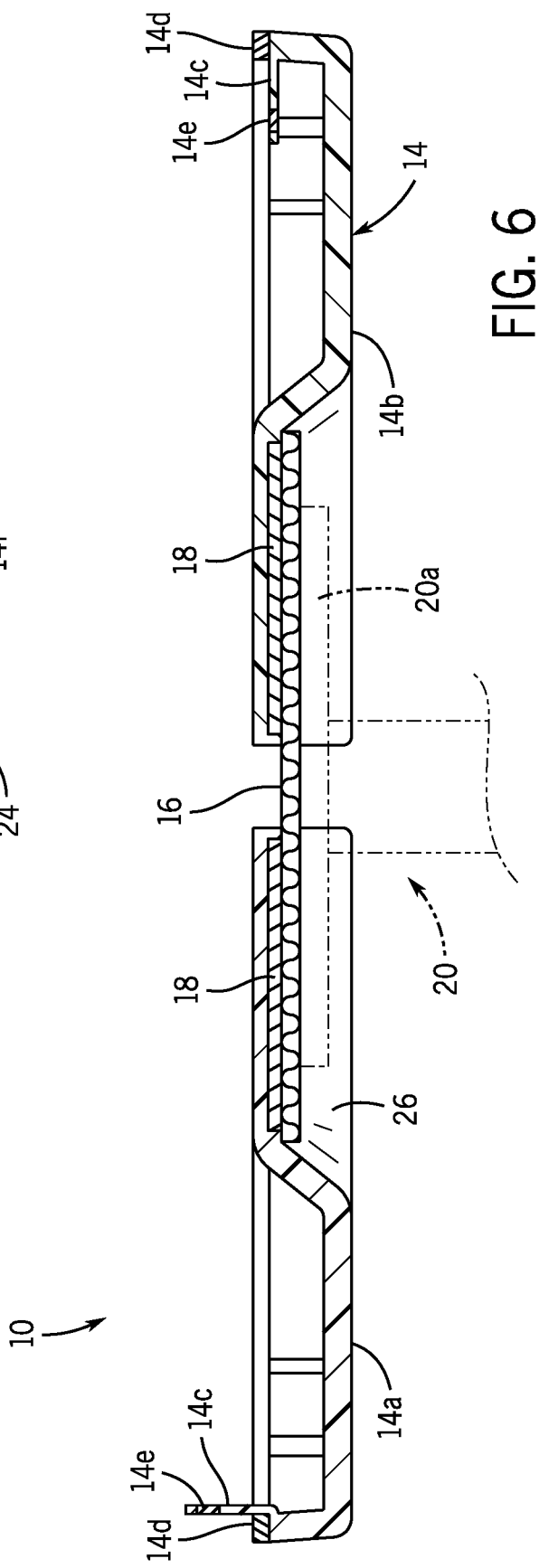

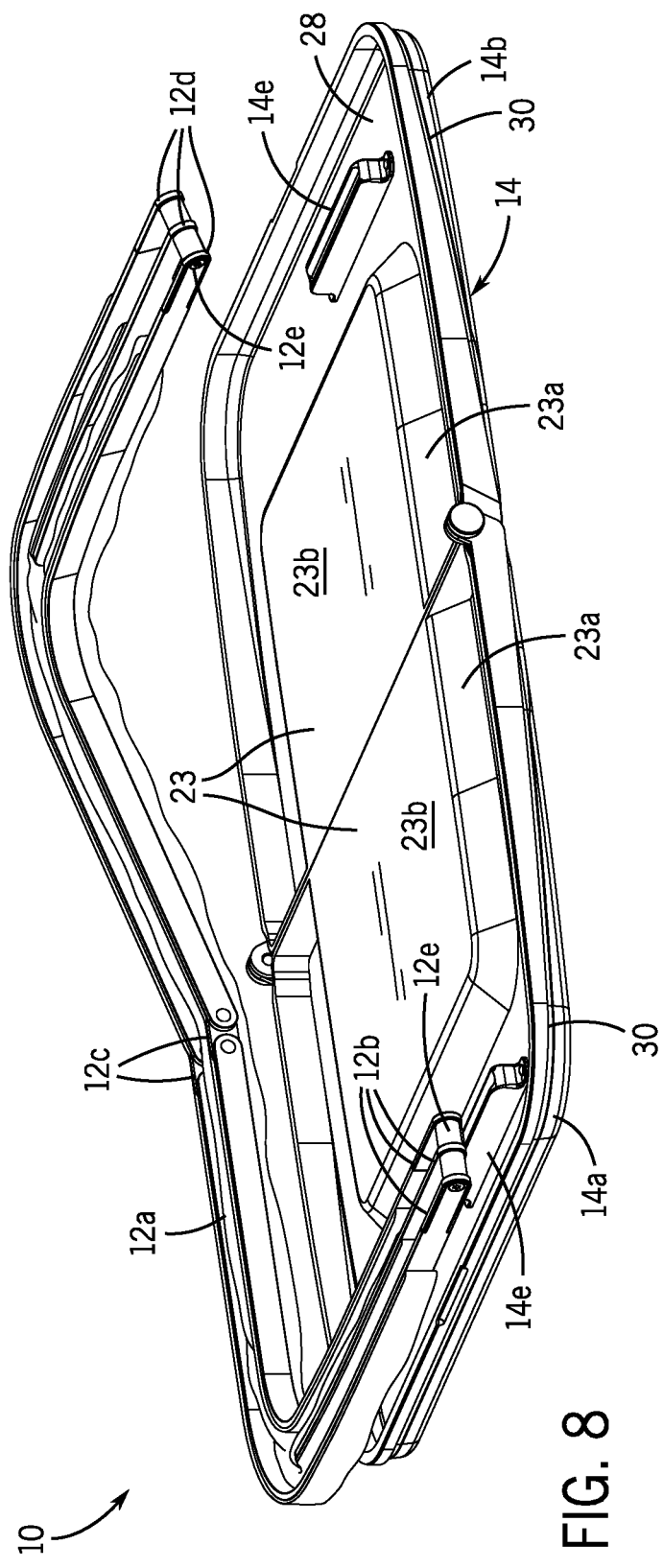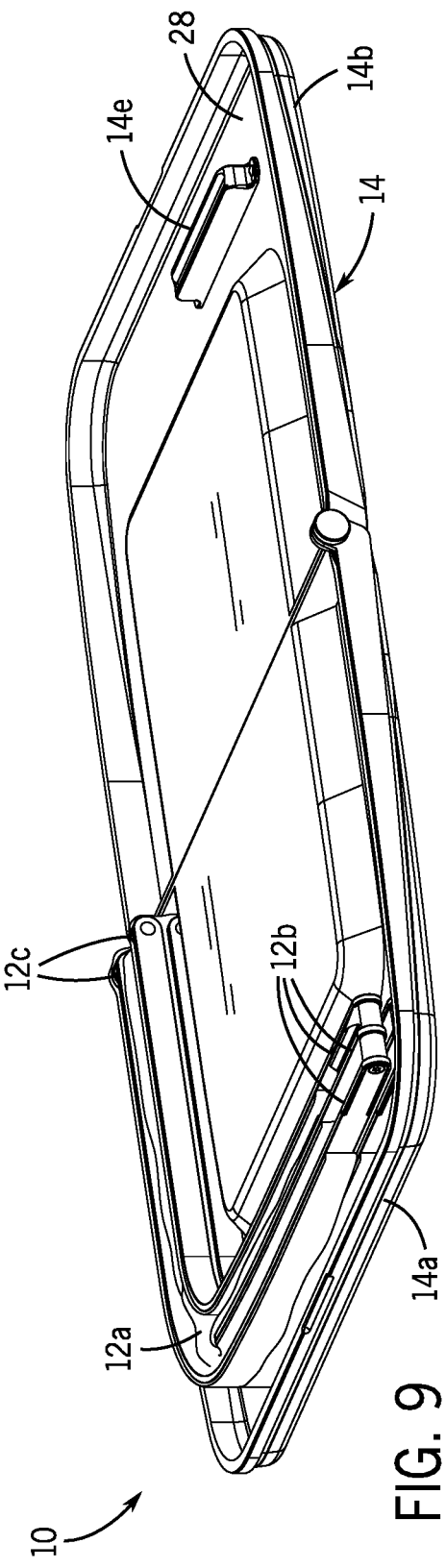

LAPTOP SHADE AND PLATFORM SYSTEM

FIELD OF INVENTION

Embodiments of the present invention relate to the field of computer and electronic accessories and relate more specifically to accessories for protecting laptops, notebook computers, tablet devices as well as other electronics devices from solar and light exposure and to provide a privacy shield when operating a laptop, notebook computer, or tablet device.

BACKGROUND

Usage of laptop computers and other electronic accessories is limited in outdoor settings where sun exposure can result in screen glare and overheating which can cause damage to computer hardware. Laptop computers and other electronic accessories are also by default subject to unwanted screen viewing by third parties. Several devices have been described that attempt to protect electronic devices from heat and sun exposure; however, these devices suffer from numerous disadvantages such as being limited in size to small devices, being too cumbersome for travel and/or portability, lacking a platform to rest or support a laptop or other electronic or non-electronic item while in use, lacking functionality that enables the shading device to be collapsed and stored within a carrying case, lacking functionality that enables a platform component to also function as the carrying case, lacking functionality which enables the protected device to be optionally used from a supported standing position via a stand or tripod-like accessory, or lacking functionality which enables the component designed to cover the laptop or other electronic or non-electronic device to be attached to a platform rather than directly attached to the laptop or other device itself.

As such, there is a need for improved systems for protecting laptops, notebook computers, and portable tablet devices from sun exposure, to prevent glare in bright lighting conditions, and to serve as a privacy shield.

Numerous external environments feature external conditions wherein the present invention would be advantageous for users. These environments include outdoor and remote work environments.

The Inventor as disclosed herein, teaches a foldable and variably deployable shade enclosure for a laptop, notebook computer, or tablet computer device designed to reduce glare from bright light sources, reduce overheating from sun exposure, and improve privacy, which is also light-weight and portable, and a platform to support a laptop, notebook computer, or tablet computer device while in use which optionally folds into a closed configuration to serve as a portable case for the overall device. These represent novel inventive concepts and functionality compared with devices defined in prior art.

OBJECTS OF THE INVENTION

It is an object of the invention to provide shade for a laptop, notebook computer, or tablet computer to reduce the risk of the device overheating from direct sunlight exposure, and to significantly reduce glare from the sun or other bright lighting so that the ability to see the device screen is not hindered.

It is also an object of the present invention to provide privacy for a device screen so that the person using the device can prevent third parties from viewing the device screen.

It is a feature of the present invention to provide an all-in-one platform where the platform case is designed to support a laptop, notebook computer, or tablet computer device when in an open configuration, and also serve as a case to store a folded shade while in a closed position.

It is another object of the present invention to provide a shade apparatus that includes one or more arced brackets that serve as the shade frame along with a flexible soft textile material that can be extended outward and variably deployed with the arced brackets when opened or deployed over a platform case to act as a canopy or shade over a laptop, notebook computer, tablet computer, or other electronic or non-electronic device.

Further objects and advantages of the invention will become apparent from the following description and claims, and from the accompanying drawings.

SUMMARY OF THE DISCLOSURE

According to various embodiments, disclosed is a device that provides a platform for a laptop with an attachable shade that can be extended over the laptop to partially enclose and shelter the laptop from sun exposure, allowing users to use their laptop outdoors without screen glare or risk of the device overheating from direct sun exposure. The device may comprise a platform to support the device while in use which can be folded to function as a case for the device, and a shade which attaches to the opened case or platform. The shade which may also be described herein as an awning, canopy, or hood may be collapsed, detached from the platform case and placed or stored inside the case. In some embodiments, the case may open up to provide a platform on which the laptop or other items may be supported. In further embodiments, the platform may be a raised section within the case. In certain embodiments, the shade may be folded and stored compactly within a compartment of the case. In yet further embodiments, the bottom of the opened platform case may include an attachment element for a stand, such as a tripod, on which the platform case may be supported.

In embodiments, the item for which the device is used may be a laptop, notebook computer. In some embodiments, the device may also be used for other electronic items, such as a tablet, cellphone, or non-electronic items such as a paper notebook, document, textbook, art canvas, and the like.

Embodiments include one, more, or any combination of all of the features listed above. Other features and advantages of the present invention will become apparent from the following more detailed description, taken in conjunction with the accompanying figures, which illustrate, by way of example, the principles of the invention.

BRIEF DESCRIPTION OF THE DRAWINGS

The detailed description of some embodiments of the invention is made below with reference to the accompanying figures, wherein like numerals represent corresponding parts of the figures.

FIG. 5 is a top rear perspective view of the of the laptop shade and platform device of FIG. 1, wherein the platform case is shown in a closed configuration FIG. 6 is a cross-sectional view of the platform case taken along line 6-6 of FIG. 3.

FIG. 8 shows the device of FIG. 7 with the platform case in an open configuration and with the shade in a collapsed and partially folded configuration and partially detached from the platform case.

FIG. 9 shows the device of FIG. 7 with the platform case in an opened configuration with the shade in a collapsed and folded configuration and detached from the platform case.

DETAILED DESCRIPTION OF CERTAIN EMBODIMENTS

Figure 1:
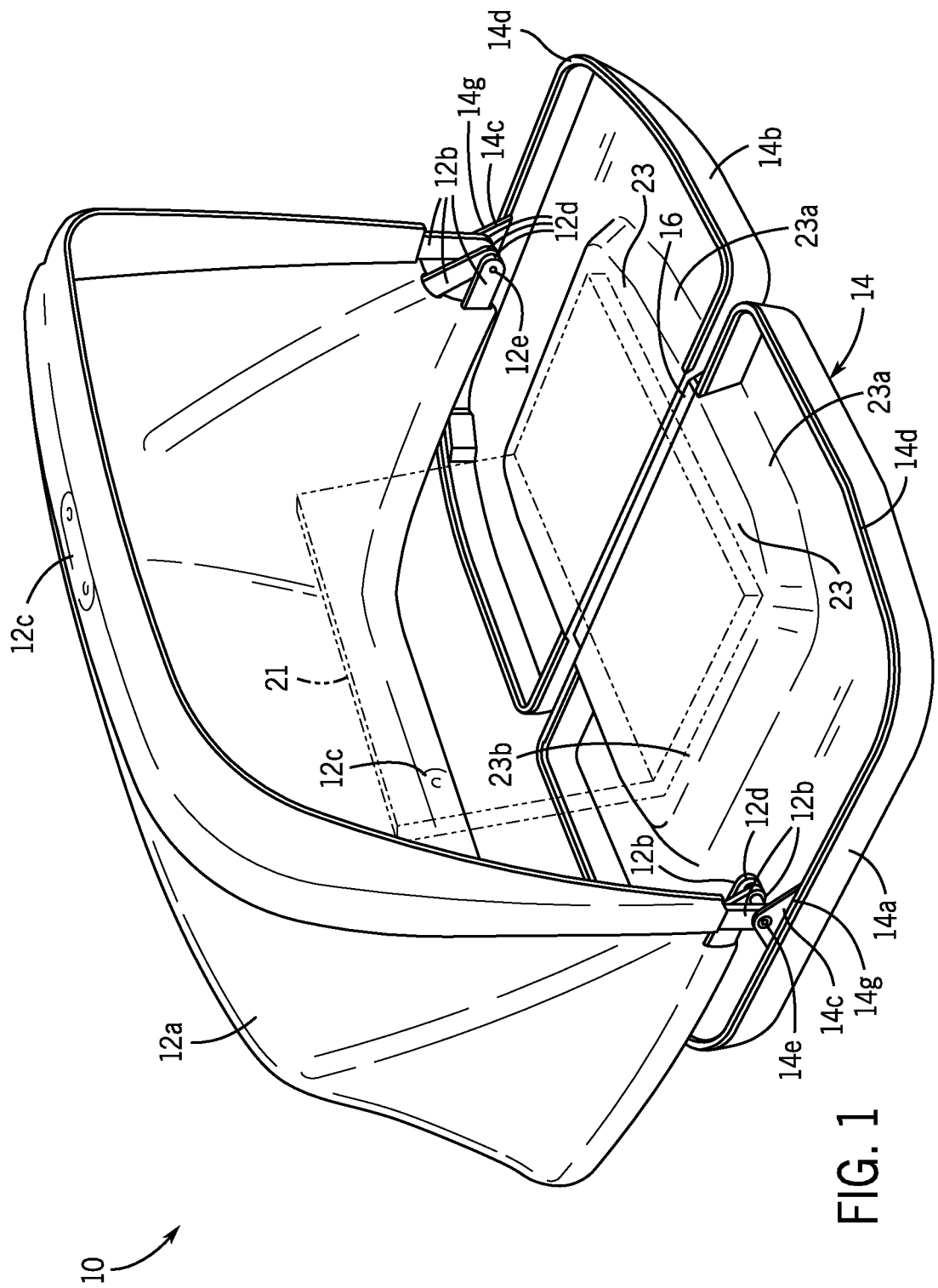
FIG. 1 is a top front perspective view of a laptop shade and platform device, including a platform case and a shade according to various embodiments, wherein the platform case is shown in an open configuration with the shade attached to the platform case and in a fully expanded configuration.

In the following detailed description of the invention, numerous details, examples, and embodiments of the invention are described. However, it will be clear and apparent to one skilled in the art that the invention is not limited to the embodiments set forth and that the invention can be adapted for any of several applications.

With reference to the accompanying figures, and in accordance with various embodiments, disclosed is a laptop shade and platform device 10, generally comprising a shade 12, and a platform case 14.

In embodiments, the platform case 14 may be configured to support a laptop 21, or other electronic or non-electronic item. Shade 12, which may also be described herein as an awning, canopy, or hood may be attached to platform case 14, and may block the supported item from unwanted glare and/or direct sun exposure. The shade 12 may be collapsed, folded, and detached from platform case 14 so that the shade 12 may be securely stored within case 14. In some embodiments, the disclosed device 10 may be configured to support accessories via a port at the bottom, for example a stand 20, such as a tripod. The standard threading configurations used for photography equipment is contemplated to be added to the stand 20 to affix and connect accessories such as a tripod.

Figure 2:
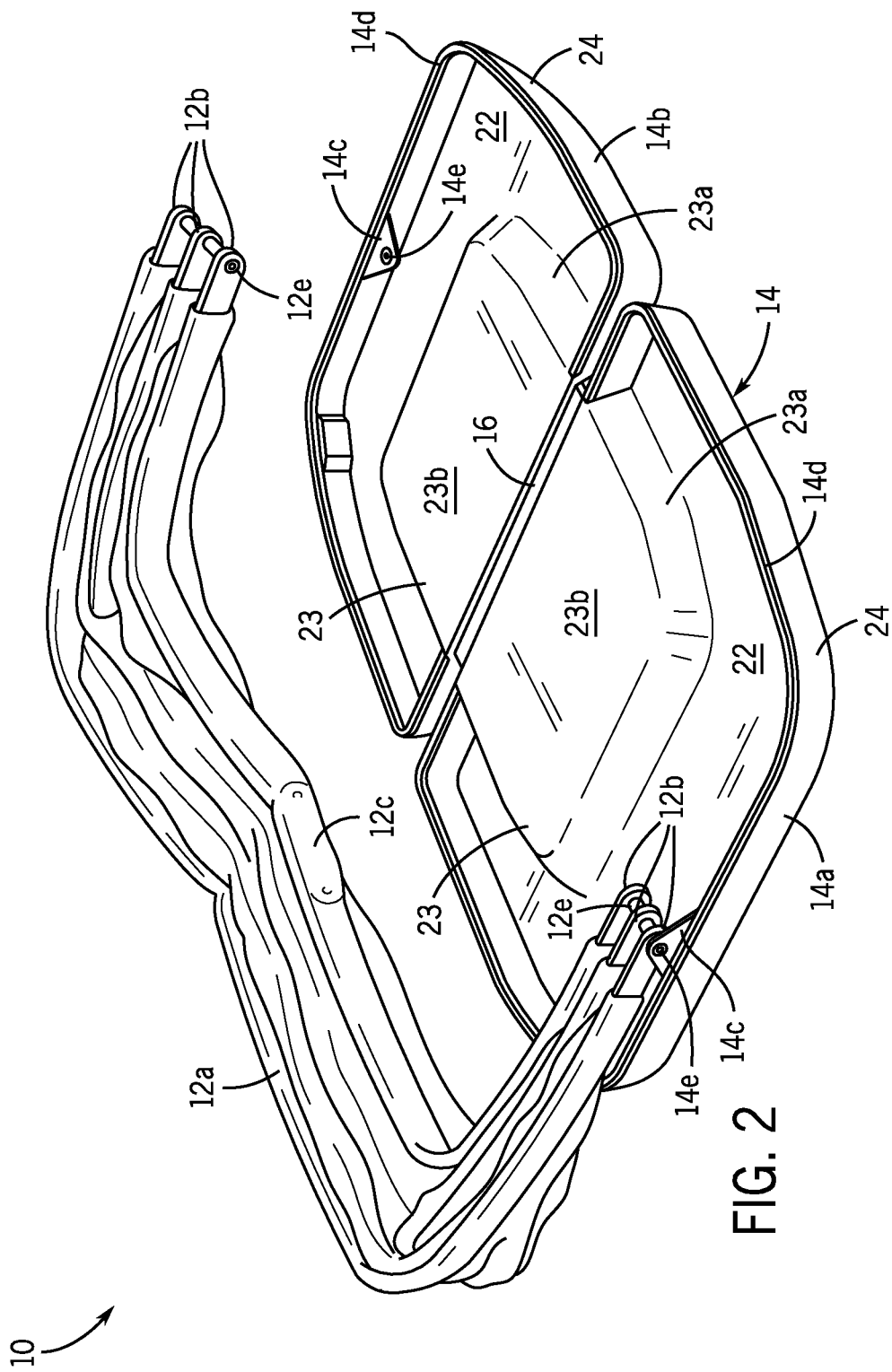
FIG. 2 shows the laptop shade and platform device of FIG. 1, with the shade shown partially detached from the platform case, and in a collapsed configuration.
Figure 3:
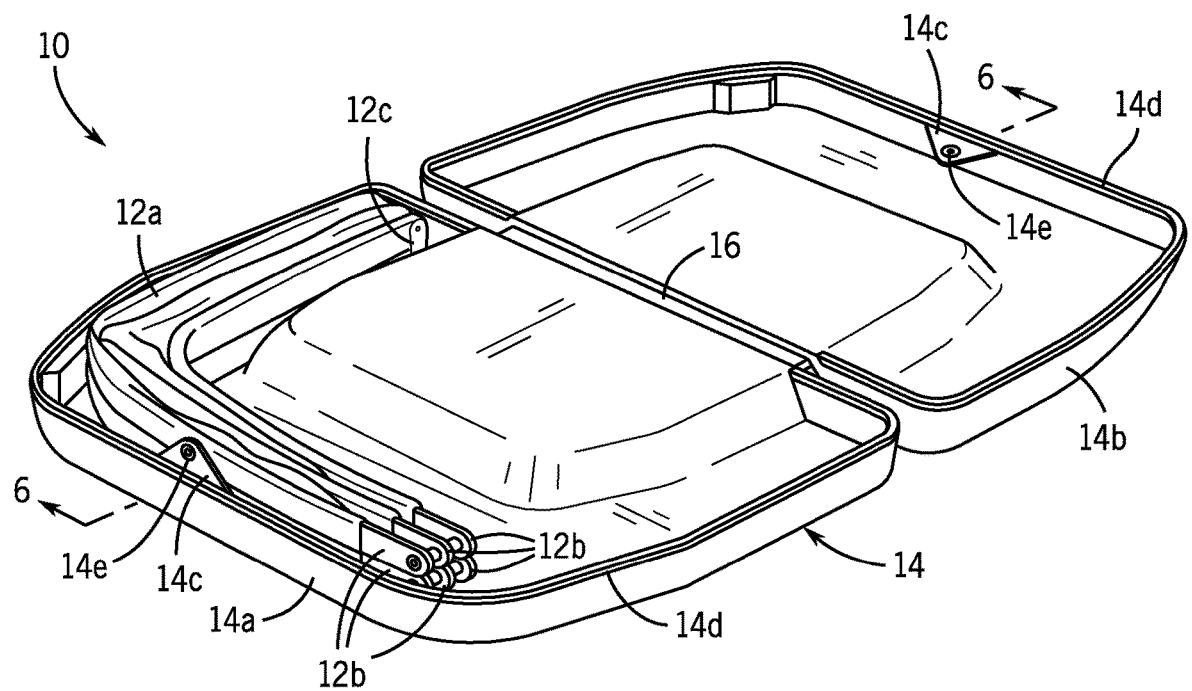
FIG. 3 shows the laptop shade and platform device of FIG. 1, with the shade shown in a collapsed and folded configuration, and detached from and stored within the platform case.
Figure 4:
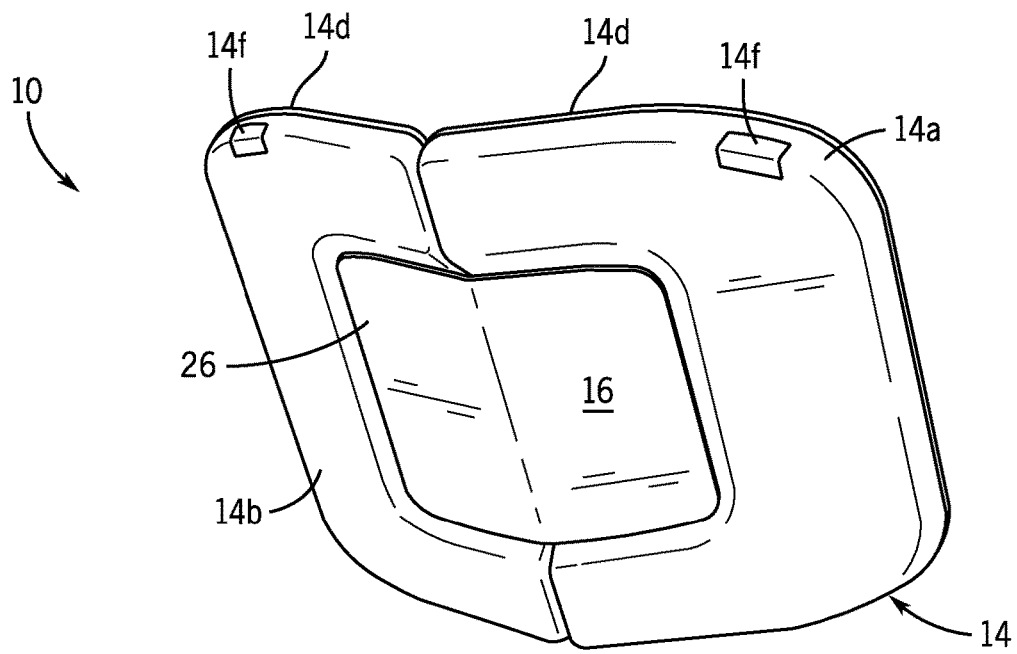
FIG. 4 is a bottom rear perspective view of the laptop shade and platform device of FIG. 1.
Figure 7:
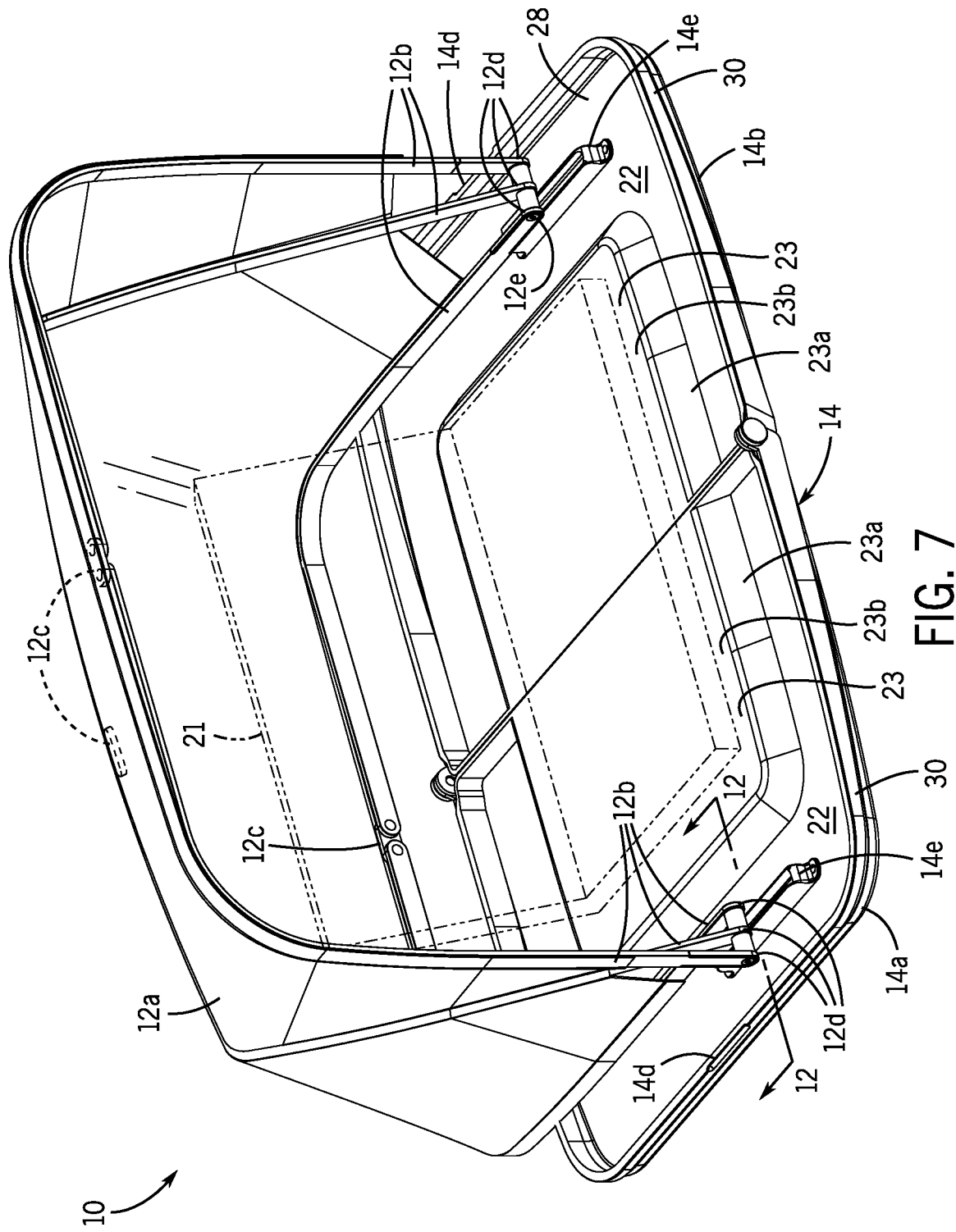
FIG. 7 is a top front perspective view of a laptop shade and platform device, according to an alternate embodiment.

In embodiments as depicted in FIGS. 1-3, shade 12 may comprise a fabric 12a or other foldable material forming its main shading body. Fabric 12a may be, for example, a canvas material, and may be sun protection factor (SPF) rated to provide protection from ultraviolet radiation.

A plurality of arced brackets serving as the shade frame 12b may provide a collapsible and expandable structural supporting frame for fabric 12a. In embodiments, a plurality of arced brackets serving as the shade frame 12b may be made of metal, plastic, or other rigid material to maintain the shape of shade 12. In some embodiments as best shown in FIGS. 1 and 2, a plurality of stays or arced brackets serving as the shade frame 12b may each maintain a rectangular, rounded, U-shaped, or C-shaped geometry. However, various geometrical configurations may be employed without departing from the inventive concept.

In embodiments, one or more arced brackets serving as the shade frame 12b may be rotationally coupled at their ends 12d via the bracket hinges 12e in order to collapse the shade 12. More specifically, a plurality of arced brackets serving as the shade frame 12b are configured to permit shade 12 to expand into an open configuration for providing shade, as shown in FIG. 1, and to collapse into a closed or collapsed configuration, as best depicted in FIG. 2. In embodiments, the bracket hinges 12e provided at each of the ends of the arced brackets 12d may be frictional hinges which allow the plurality of arced brackets serving as the shade frame 12b to remain secured in either the expanded or collapsed configuration as defined and desired by the operator. Shade 12 may further be attachable to and detachable from platform case 14 at the ends of the arced brackets 12d, as will be described in additional detail herein.

According to an exemplary embodiment as shown in FIG. 1, shade 12 may comprise a plurality of arced brackets that serve as the shade frame 12b, which are hinged to one another to provide front, central, and back structural support to the shade 12 when in an expanded configuration. However, any number of arced brackets that serve as the shade frame 12b may be used without departing from the inventive concept.

In some embodiments as depicted in FIGS. 1-3, a plurality of arced brackets that serve as the shade frame 12b may be embedded within fabric 12a. However, in other embodiments, a plurality of arced brackets that serve as the shade frame 12b may be attached to the fabric, but not embedded within it.

In embodiments, each of the stays or arced brackets which serve as the shade frame 12b may include a center hinge 12c to permit shade 12 to fold about center hinge 12c. Thus, each stay or arced bracket may have a first arc half and a second arc half, which are foldable over each other to enable shade 12 to transition from an unfolded collapsed configuration as shown in FIG. 2, to a folded collapsed configuration as shown in FIG. 3 for compact storage within case 14.

In embodiments as shown in FIGS. 1-6, platform case 14 may comprise a first shell 14a and a second shell 14b, which may be coupled to one another at case hinge 16. In embodiments, first shell 14a and second shell 14b may contain a product label and branding element 14f on the outer side of case 14. In some embodiments, the inner side of case 14 may be lined with a soft touch material 28.

In embodiments, hinge 16 is configured to permit first shell 14a and second shell 14b to rotationally move with respect to one another for opening and closing platform case 14. First shell 14a and second shell 14b may each comprise a base platform 22, at least partially bordered by side walls 24 that extend upwardly from base platform 22 to form interior compartments of case 14.

In certain embodiments, an elevated internal platform 23 may be centrally located within platform case 14. The platform 23 may conversely define a cavity 26 on the outer side of platform case 14. Platform 23 may be formed by a first platform half within first shell 14a and a second platform half within second shell 14b, which together form platform 23 when platform case 14 is fully opened (i.e. when shells 14a and 14b are oriented approximately 180 degrees with respect to one another). Thus, platform top 23b provides a leveled surface when platform case 14 is fully opened for supporting laptop 21 or other object. Platform 23 may comprise walls 23a which extend generally upwards from base platform 22, and platform top 23b which extends laterally from walls 23a. In embodiments, walls 23a may be raised to about the same height of side walls 24. In other embodiments, walls 23a may be lower than side walls 24 to provide space for storage of a device such as laptop 21 when case 14 is closed.

In certain embodiments, hinge 16 may comprise a fabric material that rotationally couples first and second shells 14a and 14b. In embodiments, the fabric material forming hinge 16 may be attached to the bottom side of platform case 14 and may cover a surface area of cavity 26 to provide an external surface covering for cavity 26. However, in other embodiments, hinge 16 may be formed from other material such as metal, plastic, etc. Additionally, other types of hinges and hinge configurations may be employed without departing from the inventive concept.

Figure 10:
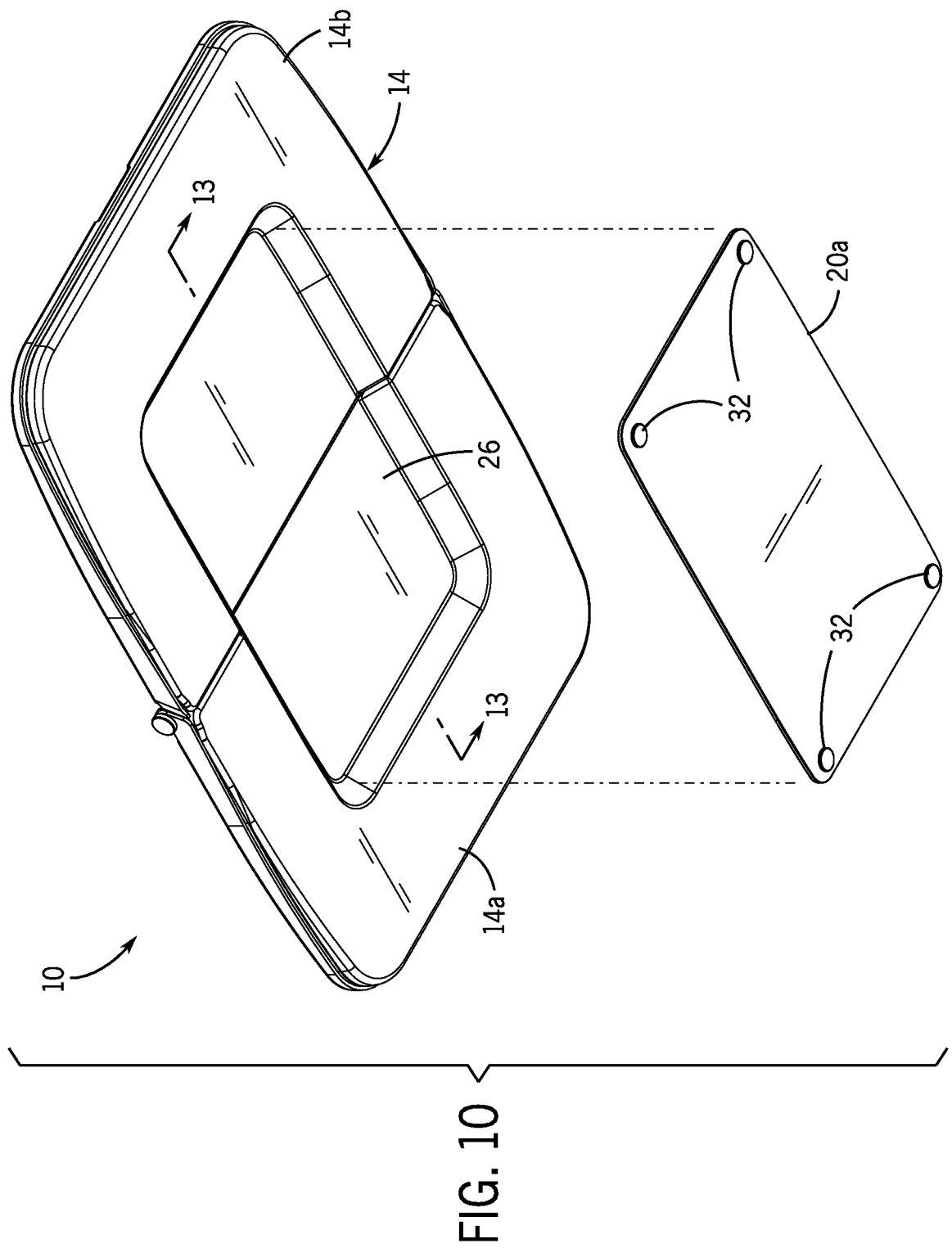
FIG. 10 is a bottom perspective exploded view of the device of FIG. 7.
Figure 12:
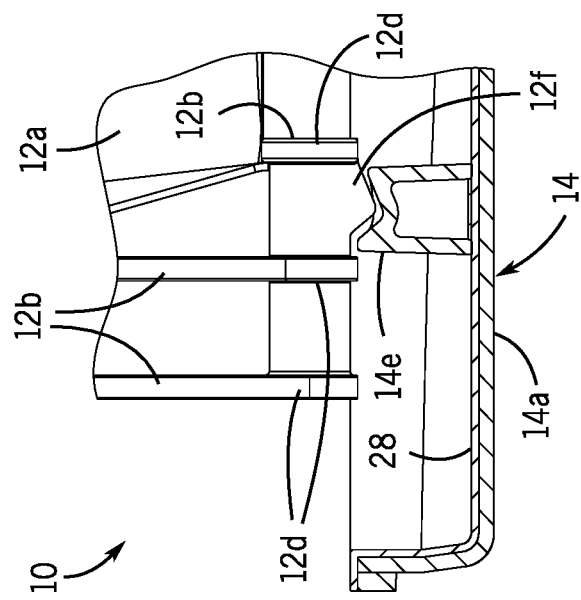
FIG. 12 is a cross-sectional view taken along line 12-12 of FIG. 7.
Figure 11:
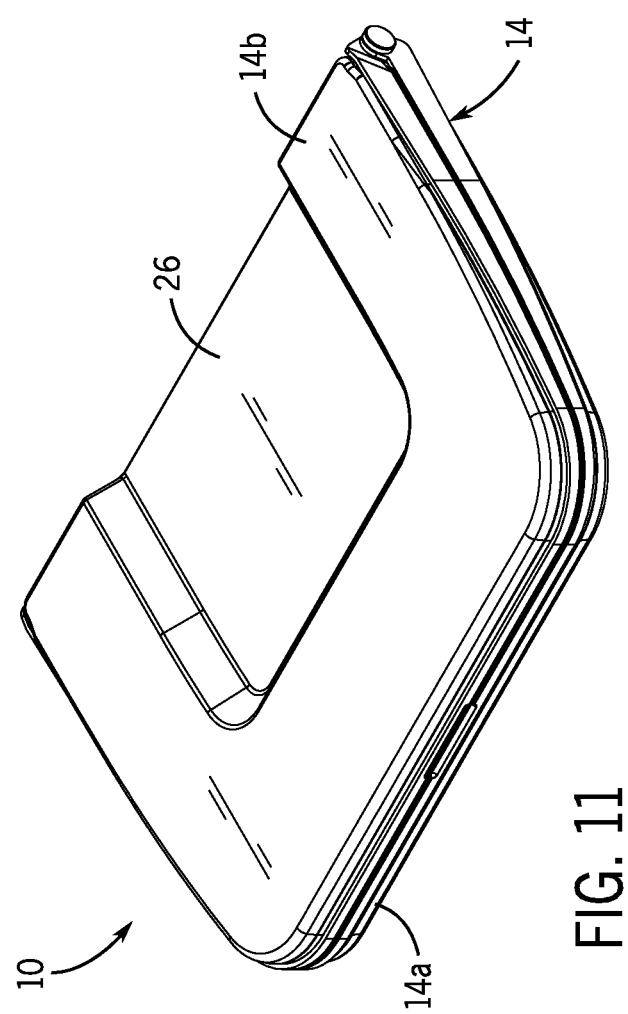
FIG. 11 shows the device of FIG. 7 with the platform case in a closed configuration.
Figure 13:
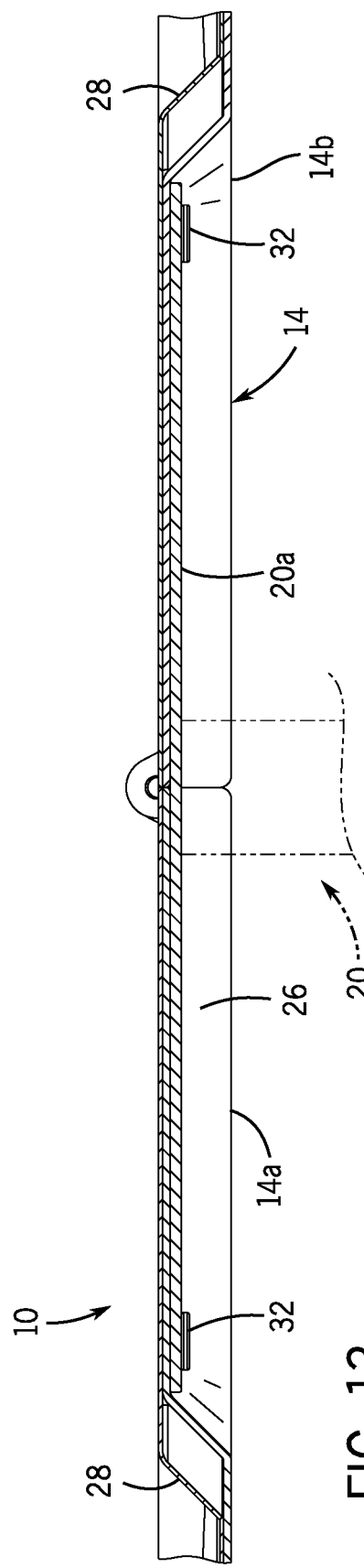
FIG. 13 is a cross-sectional view taken along line 13-13 of FIG. 10.
Figure 14:
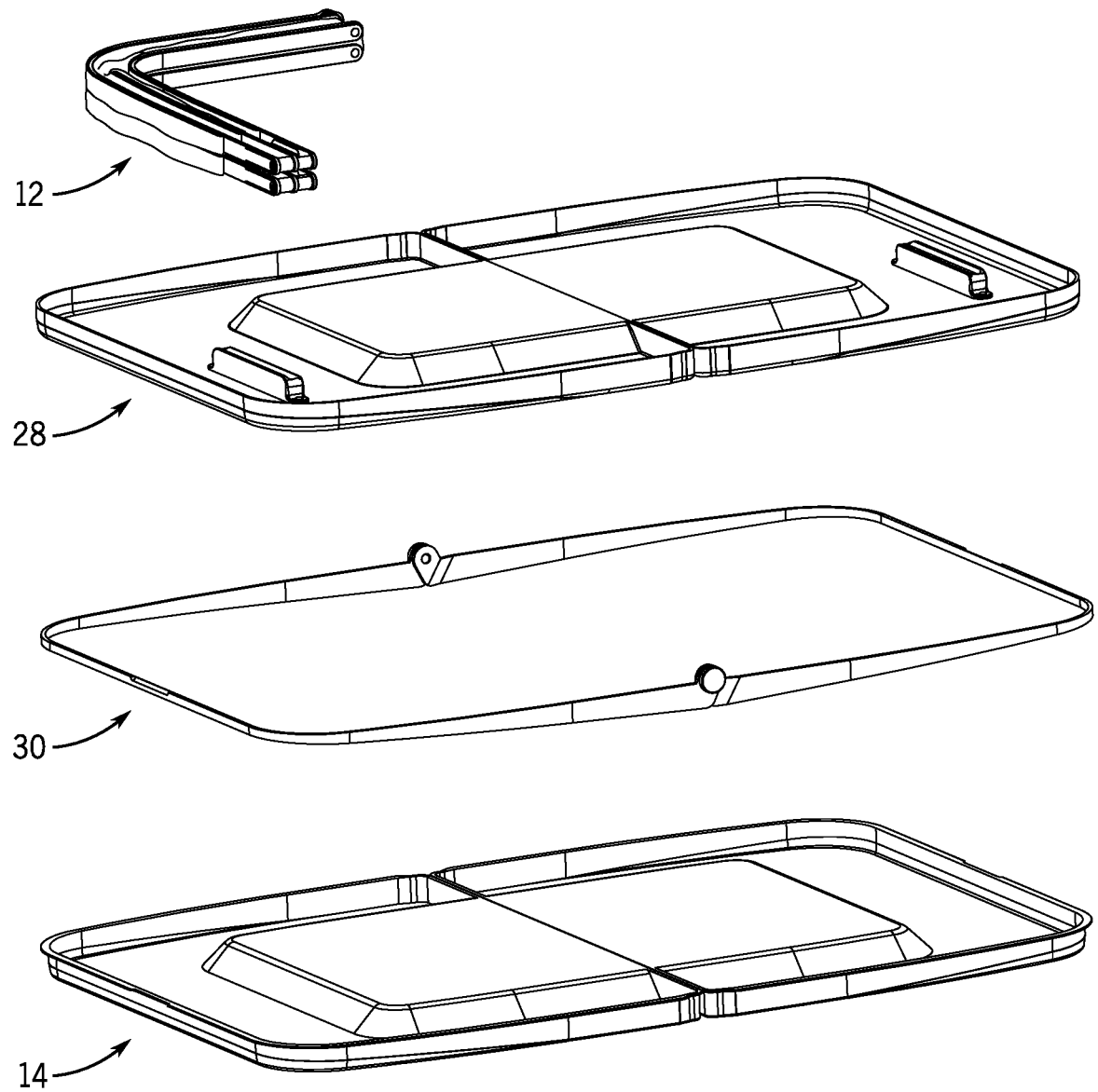
FIG. 14 is an exploded perspective view of the device of FIG. 7.

In some embodiments as depicted in FIG. 6, one or more magnetic plates 18 may be provided within cavity 26 to provide a magnetic attachment element for a stand 20, which may further comprise metallic plate 20a, or other metallic stand such as a tripod. In certain embodiments as depicted in FIG. 6, magnetic plates 18 may be embedded between the fabric forming hinge 16 and cavity 26. As such, cavity 26 may provide a sufficiently stable holding site for stand 20 or similar device that may be used as a stand for supporting the platform case 14 and laptop 21. In some further embodiments as shown in FIG. 10, additional magnets 32 may be provided for attachment of metallic plate 20a.

In certain embodiments as shown in FIG. 3, a corner area between side walls 24 and walls 23a of internal platform 23 may form a side well in which shade 12 may be conveniently tucked and stored in its folded configuration. Other items, such as a laptop cord, a pouch (e.g. for holding glasses, pens, etc.), a wallet, or other items may be similarly tucked and stored within the case 14.

In embodiments, platform case 14 may be provided with a magnetic closure element. This may comprise, for example, magnetic strips 14d which may be provided at the top ends of side walls 24 of each of shells 14a and 14b for enabling case 14 to be secured in a closed configuration. In embodiments, magnetic strips 14d of shell 14a may have a polarity which is opposite that of magnetic strips of shell 14b, or one strip 14d may be a magnet and the other a ferromagnetic metal. However, other various magnetic components may be used in an embodiment described herein without departing from the inventive concept.

In some embodiments, platform case 14 may further comprise shade attachment sites 14e within the inner portions of the first shell and the second shell of the case. The shade attachment sites 14e may comprise magnetic shade attachments configured to magnetically attach the shade assembly 12 to the platform case 14. In embodiments, shade attachment sites 14e and ends of the arced brackets 12d may be magnets of opposite polarities, or one may be magnetic, while the other a ferromagnetic metal. In some embodiments, magnetic shade attachments 14e may comprise rounded magnets, and may be slightly indented to provide a magnetic capture site for shade assembly 12.

In some embodiments, shade attachments 14e may be provided on tabs 14c which may extend from intermediate sections 14g of walls 24 at each of shells 14a and 14b. In some embodiments, tabs 14c may be foldable, as best shown in FIGS. 2, 3, and 6. This enables tabs 14c to be moved so that the case 14 may be placed in a closed configuration. In some embodiments, one of the tabs 14c may be folded over the stored shade 12 to help secure the shade 12 from moving about when not in use.

According to various embodiments, a user may attach shade 12 to the platform case 14 via shade attachment sites 14e. In some embodiments the shade 12 may attach to the shade attachment sites 14e magnetically. In other embodiments the shade 12 may attach to the shade attachment sites 14e via a clip-in or click-in fastener, via a hook and loop connection, or other binding mechanism. The user may expand the shade 12 to provide shading for a laptop, notebook computer, tablet device, or other item which may be placed on the internal platform in order to shield it from the sun and/or for desired privacy. Thereafter, the shade 12 may be collapsed, detached from the platform case 14, and folded, then tucked within the case 14 for storage and portability.

According to an alternate embodiment as shown in FIGS. 7-14, device 10 may comprise a case hinge 30 that resembles or mimics the functionality of a bear trap, which may be manufactured from a rigid material such as hard metal or rigid polymer. Case hinge 30 may integrate with side walls 24 to surround platform case 14, as well as provide hinge functionality. Additionally, a top case surface 28 may overlay platform case 14, and may provide a soft touch lining for the case 14.

In some further alternative embodiments as shown in FIGS. 7-14, magnetic shade attachments 14e may be configured as magnetic tracks or rails rather than provided on folding tabs. According to this alternate embodiment, shade 12 may comprise an angled foot 12f which may be configured to magnetically attach to a magnetic component within the magnetic track. Additionally, shade attachment sites 14e may be provided within the base platform 22, between the elevated platform 23 and side walls 24 of the platform case 14.

As such, the disclosed device may provide a platform for a laptop, notebook computer, portable tablet, or other device (with an attachable shade, awning, canopy, or hood) that can be extended over the device to partially enclose and shelter the device from sun exposure, allowing users to use their laptop or other device outdoors without screen glare or risk of the device overheating from direct sun exposure. Use of the shade also provides a layer of privacy while an individual operates the device in an outdoor or public environment. Additionally, the device folds into a carrying case, wherein the shade 12 may be detached and placed inside the carrying case. The device also has attachments that allow it to connect to a plate supported by a standard photography tripod with accompanying threading or other stand.

In general, the terms used in the claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Particular terminology used when describing certain features or aspects of the invention should not be taken to imply that the terminology is being redefined herein to be restricted to any specific characteristics, features, or aspects of the invention with which that terminology is associated. In general, the terms used in the claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems.

The above detailed description of the embodiments of the invention is not intended to be exhaustive or to limit the invention to the precise embodiment or form disclosed herein or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

In light of the above "Detailed Description," Inventor may make changes to the invention. While the detailed description outlines possible embodiments of the invention and discloses the best mode contemplated, no matter how detailed the above appears in text, the invention may be practiced in a myriad of ways. Thus, implementation details may vary considerably while still being encompassed by the spirit of the invention as disclosed by the inventor. As discussed herein, specific terminology used when describing certain features or aspects of the invention should not be taken to imply that the terminology is being redefined herein to be restricted to any specific characteristics, features, or aspects of the invention with which that terminology is associated.

What is claimed is:

1. A shade and platform device for providing support and shading to a laptop or other item, the shade and platform device comprising:
    a platform case including a first shell and a second shell which are coupled via a case hinge, wherein the first shell and the second shell each comprise a base platform at least partially bordered by case side walls that extend upwardly from the base platform to form an interior compartment of each of the first shell and the second shell; and
    a shade including a main shading body, a plurality of arced brackets which serve as a supporting frame for the shade each comprising a first end and a second end, a first bracket hinge which rotationally couples the plurality of arced brackets to one another at their first ends, and a second bracket hinge which rotationally couples the plurality of arced brackets to one another at their second ends,
    wherein the platform case is movable between a closed state and an opened state via movement of the first shell and second shell with respect to one another,
    wherein the shade is movable between a collapsed configuration and an expanded configuration via movement of the arced brackets with respect to one another,
    wherein the shade is attachable to the platform case via attachment of the shade to shade attachment sites in each of the first shell and the second shell,
    wherein the shade is further detachable from the platform case via detachment of the shade from the shade attachment sites,
    wherein the shade is configured to reduce ambient light exposure to an item contained within the platform case when the platform case is in the opened state and the shade is in the expanded configuration and attached to the platform case,
    wherein the platform case includes an elevated internal platform within the platform case, the elevated internal platform including internal platform walls that extend upwardly from the base platform of the first shell and the base platform of the second shell, and a top internal platform surface extending laterally from the internal platform walls to provide a leveled raised surface for supporting the laptop or other item when the platform case is in the opened state,
    wherein said elevated internal platform defines a cavity on an outer side of the platform case, and
    wherein a well is formed between the internal platform walls and the case side walls, the well being configured to nest the shade in its collapsed configuration.

2. The shade and platform device of claim 1, wherein the first bracket hinge and the second bracket hinge are friction hinges which maintain position strictly via friction.

3. The shade and platform device of claim 1, wherein each of the plurality of arced brackets further comprises a first arc half and a second arc half that are coupled by a center hinge, said center hinge configured to enable the first arc half and the second arc half to fold over one another, to enable the shade to be folded from the collapsed configuration to a folded configuration.

4. The shade and platform device of claim 1, wherein the shade is magnetically attachable to one or more shade attachment sites contained on the platform case.

5. The shade and platform device of claim 1, further comprising a stand attachment element configured for attachment to a stand on which the case may optionally be supported.

6. The shade and platform device of claim 5, wherein the stand attachment element is located within the cavity on said outer side of the platform case.

7. The shade and platform device of claim 6, wherein the stand comprises a tripod.

8. The shade and platform device of claim 5, wherein the stand attachment element comprises a magnetic element.

9. The shade and platform device of claim 5, wherein the stand attachment element comprises a threading attachment element.

10. The shade and platform device of claim 1, further comprising a magnet element configured to secure the first shell to the second shell when the platform case is in the closed state.

11. A shade and platform device for providing support and shading to a laptop or other item, the shade and platform device comprising:

a platform case including a first shell and a second shell which are coupled via a case hinge, wherein the first shell and the second shell each comprise a base platform at least partially bordered by case side walls that extend upwardly from the base platform to form an interior compartment of each of the first shell and the second shell; and a shade including a main shading body, a plurality of arced brackets which serve as a supporting frame for the shade, each comprising a first end and a second end, a first bracket hinge which rotationally couples the plurality of arced brackets to one another at their first ends, and a second bracket hinge which rotationally couples the plurality of arced brackets to one another at their second ends, wherein the platform case is movable between a closed state and an opened state via movement of the first shell and second shell with respect to one another, wherein the shade is movable between a collapsed configuration and an expanded configuration via movement of the arced brackets with respect to one another, wherein the shade is configured to reduce ambient light exposure to an item contained within the platform case when the platform case is in the opened state and the shade is in the expanded configuration and attached to shade attachment sites in each of the first shell and the second shell wherein the platform case includes an elevated internal platform within the platform case, the elevated internal platform including internal platform walls that extend upwardly from the base platform of the first shell and the base platform of the second shell, and a top internal platform surface extending laterally from the internal platform walls to provide a leveled raised surface for supporting the laptop or other item when the platform case is in the open state, wherein said elevated internal platform defines a cavity on an outer side of the platform case, an wherein a well is formed between the internal platform walls and the case side walls and, wherein each of the plurality of arced brackets further comprises a first arc half and a second arc half that are coupled by a center hinge, said center hinge configured to enable the first arc half and the second arc half to fold over one another, to enable the shade to be folded from the collapsed configuration to a folded configuration.

12. A shade and platform device for providing support and shading to a laptop or other item, the shade and platform device comprising:

a platform case including a first shell and a second shell which are coupled via a case hinge, wherein the first shell and the second shell each comprise a base platform at least partially bordered by case side walls that extend upwardly from the base platform to form an interior compartment of each of the first shell and the second shell; and a shade including a main shading body, a plurality of arced brackets which serve as a supporting frame for the shade, each comprising a first end and a second end, a first bracket hinge which rotationally couples the plurality of arced brackets to one another at their first ends, and a second bracket hinge which rotationally couples the plurality of arced brackets to one another at their second ends, wherein each of the plurality of arced brackets further comprises a first arc half and a second arc half that are coupled by a center hinge, said center hinge configured to enable the first arc half and the second arc half to fold over one another, to enable the shade to be folded from the collapsed configuration to a collapsed and folded configuration, wherein the platform case is movable between a closed state and an opened state via movement of the first shell and second shell about a singular axis with respect to one another, wherein the shade is movable between a collapsed configuration and an expanded configuration via movement of the arced brackets with respect to one another, wherein the shade is configured to provide an opening on the front side of the shade between the base platform and highest point of the shade when the platform case is in the opened state and the shade is in the expanded configuration and attached to shade attachment sites in the case, said front side of the shade configured to face a user for enabling the user to view an item contained underneath the shade and on top of the base platform, while reducing ambient light exposure to the item.

13. The shade and platform device of claim 12, wherein the case further comprises an internal well configured to hold the shade when the shade is in the collapsed configuration and/or in the collapsed and folded configuration.

14. The shade and platform device of claim 12, wherein the first shell and the second shell are coupled by a bear trap type hinge.

15. The shade and platform device of claim 12, further comprising a stand attachment element configured for attachment to a stand on which the case may optionally be supported.

16. The shade and platform device of claim 15, wherein the stand is a tripod.

* * * * *